United States Patent
Li et al.

(10) Patent No.: US 11,838,541 B2
(45) Date of Patent: Dec. 5, 2023

(54) MATRIX WEIGHTED INTRA PREDICTION OF VIDEO SIGNALS

(71) Applicant: ALIBABA GROUP HOLDING LIMITED, Grand Cayman (KY)

(72) Inventors: Xinwei Li, San Mateo, CA (US); Ru-Ling Liao, Beijing (CN); Yamei Chen, Beijing (CN); Jie Chen, Beijing (CN); Yan Ye, San Mateo, CA (US); Jiancong Luo, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 150 days.

(21) Appl. No.: 16/940,692

(22) Filed: Jul. 28, 2020

(65) Prior Publication Data

US 2021/0067803 A1    Mar. 4, 2021

Related U.S. Application Data

(60) Provisional application No. 62/894,489, filed on Aug. 30, 2019.

(51) Int. Cl.
  *H04N 19/176*    (2014.01)
  *H04N 19/593*    (2014.01)

(52) U.S. Cl.
  CPC ......... *H04N 19/593* (2014.11); *H04N 19/176* (2014.11)

(58) Field of Classification Search
  CPC .... H04N 19/11; H04N 19/136; H04N 19/176; H04N 19/593
  See application file for complete search history.

(56) References Cited

U.S. PATENT DOCUMENTS

| | | | |
|---|---|---|---|
| 2012/0201300 A1* | 8/2012 | Kim | H04N 19/119 |
| | | | 375/240.12 |
| 2014/0126634 A1 | 5/2014 | Zheludkov et al. | |
| 2019/0045188 A1* | 2/2019 | Mahdi | H04N 19/18 |
| 2020/0322620 A1* | 10/2020 | Zhao | H04N 19/463 |
| 2020/0344468 A1* | 10/2020 | Lin | H04N 19/42 |

(Continued)

FOREIGN PATENT DOCUMENTS

EP      3820151 A1 *   5/2021   ............... G06F 5/01

OTHER PUBLICATIONS

"Requirements for a Future Video Coding Standard v5," International Organisation for Standardisation, Torino, IT, 14 pages (2017).

(Continued)

*Primary Examiner* — Md N Haque
(74) *Attorney, Agent, or Firm* — Finnegan Henderson, Farabow, Garrett & Dunner, LLP

(57) ABSTRACT

The present disclosure provides methods for performing simplified matrix weighted intra prediction. The method can include: determining a classification of a target block; and generating, based on the classification, a matrix-weighted intra prediction (MIP) signal, wherein determining the classification of the target block comprises: in response to the target block having a size of 4×4, determining that the target block belongs to a first class; or in response to the target block having a size of 8×8, 4×N or N×4, N being an integer between 8 and 64, determining that the target block belongs to a second class.

20 Claims, 13 Drawing Sheets

Table 6: The differences between three classes

| Class | The number of modes | The number of matrices (M) | The size of matrices | The size of input vector | The size of reduced prediction signal |
|---|---|---|---|---|---|
| Class0 | 35 | 18 | 16×4 | 4×1 | 16(4×4) |
| Class1 | 19 | 10 | 16×8 | 8×1 | 16(4×4) |
| Class2 | 11 | 6 | 64×7 | 7×1 | 64(8×8)/32(4×8)/ 32(8×4) |

(56) References Cited

U.S. PATENT DOCUMENTS

| | | | | |
|---|---|---|---|---|
| 2020/0359037 | A1* | 11/2020 | Ramasubramonian | ..................... |
| | | | | H04N 19/176 |
| 2020/0359050 | A1* | 11/2020 | Van der Auwera | .... H04N 19/42 |
| 2020/0404325 | A1* | 12/2020 | Ramasubramonian | ..................... |
| | | | | H04N 19/70 |
| 2022/0109876 | A1* | 4/2022 | Zhang | ................... H04N 19/60 |

OTHER PUBLICATIONS

Bross et al., "Versatile Video Coding (Draft 6)," JVET-O2001-vE, 15$^{th}$ Meeting: Gothenburg, SE, Jul. 3-12, 2019, 455 pages.

Chen et al., Algorithm description for Versatile Video Coding and Test Model 5 (VTM 5), JVET-N1002-v2, 14$^{th}$ Meeting: Geneva, CH Mar. 19-27, 2019, 77 pages.

Chen et al., "Algorithm Description of Joint Exploration Test Model 7 (JEM 7)," JVET-G1001-v1, 7$^{th}$ Meeting: Torino, IT, Jul. 13-21, 2017, 50 pages.

Helle et al., "Variations of the 8-bit implementation of MIP," JVET-O0481-v3, 15$^{th}$ Meeting: Gothenburg, SE, Jul. 3-12, 2019, 8 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

JEM, https://jvet.hhi.fraunhofer.de/svn/svn_HMJEMSoftware.

Sullivan et al., "Overview of the High Efficiency Video Coding (HEVC) Standard," IEE Transactions on Circuits and Systems for Video Technology, vol. 22, No. 12, pp. 1649-1668 (2012).

PCT International Search Report and Written Opinion dated Oct. 22, 2020, issued in corresponding International Application No. PCT/US2020/043839 (14 pgs.).

Aidoneus, "VVC intra prediction supplement: Matrix Weighted Intra Prediction (MIP)", retrieved from the internet URL: https://translate.google.com/translate?hl=en&sl=auto&tl=en&u=https%3A%2F%2Fblog.csdn.net%Fu012038173%2Farticle%2Fdetails%2F90671165, 10 pages, Jun. 4, 2019.

European Search Report and European supplemental Search Report, issued by the European Patent Office, corresponding with European Application No. 20 859 552.0, dated Aug. 8, 2022. (8 pages).

Ramasubramonian et al. "Non-CE3: On Signalling of MIP Parameters," MPEG Meeting; Jul. 8, 2019-Jul. 12, 2019; Gothenburg; No. m48952, Jul. 7, 2019, XP030206997, Retrieved from the Internet: URL: http://phenix.int-evry.fr/mpeg/doc_end_user/documents/127 Gothenburg/wg 11 /m48952-JVET-O0755-v3-JVET-O0755-v3.zipJVET-O0755-v2.docx (10 pages).

Ramasubramonian et al. "Non-CE3: MIP Simplifications," JVET Meeting; Jul. 3, 2019-Jul. 12, 2019; Gothenburg; No. JVET-O0187 Jun. 23, 2019, XP030205752, Retrieved from the Internet: URL:http://phenix.int-evry.fr/jvet/doc_end_user/documents/15_Gothenburg/wg11/JVET-O0187-v1 .zip JVET-O0187-v1 .docx (6 pages).

Pfaff et al., "CE3—Affine Linear Weighted Intra Prediction," JVET Meeting; Mar. 19, 2019-Mar. 27, 2019; Geneva; No. JVET-N0217, Mar. 25, 2019, XP030256694, Retrieved from the Internet: URL: http://phenix.int-evry. fr/jvet/doc_end_user/documents/14_ Geneva/wg11 /JVET-N0217-v3.zip JVET-N0217 v1 .docx (17 pages).

Li et al., "Non-CE3: Removal of leaving out operation for 4x16 and 16x4 MIP blocks," JVET Meeting; Oct. 1, 2019-Oct. 11, 2019; Geneva; No. JVET-P0303 ; m50268, Oct. 1, 2019, XP030216878, Retrieved from the Internet: URL:http://phenix.int-evry.fr/jvet/doc_end_user/documents/16_Geneva/wg11/JVET-P0303-v2.zip JVET-P0303-v2.docx (8 pages).

* cited by examiner

FIG. 5: Matrix weighted intra prediction

Table 6: The differences between three classes

| Class | The number of modes | The number of matrices (M) | The size of matrices | The size of input vector | The size of reduced prediction signal |
|---|---|---|---|---|---|
| Class0 | 35 | 18 | 16×4 | 4×1 | 16(4×4) |
| Class1 | 19 | 10 | 16×8 | 8×1 | 16(4×4) |
| Class2 | 11 | 6 | 64×7 | 7×1 | 64(8×8)/32(4×8)/ 32(8×4) |

FIG. 6

Table 7. The lookup table for offset sO

|        | matrix number $N_i$ | | | | | | | | | | | | | | | | | |
|--------|---|----|----|----|----|----|----|----|----|----|----|----|----|----|----|----|----|----|
|        | 0 | 1  | 2  | 3  | 4  | 5  | 6  | 7  | 8  | 9  | 10 | 11 | 12 | 13 | 14 | 15 | 16 | 17 |
| Class0 | 34| 21 | 7  | 27 | 27 | 28 | 56 | 13 | 47 | 15 | 40 | 21 | 16 | 7  | 45 | 66 | 21 | 32 |
| Class1 | 17| 20 | 11 | 45 | 17 | 11 | 23 | 10 | 21 | 11 |    |    |    |    |    |    |    |    |
| Class2 | 8 | 46 | 16 | 10 | 13 | 11 |    |    |    |    |    |    |    |    |    |    |    |    |

FIG. 7

Table 8. The lookup table for shift sW

| | matrix number $N_j$ | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| Class0 | 6 | 6 | 6 | 5 | 6 | 5 | 5 | 6 | 5 | 6 | 6 | 6 | 6 | 5 | 6 | 5 | 5 | |
| Class1 | 6 | 6 | 6 | 6 | 6 | 6 | 6 | 6 | 6 | 7 | | | | | | | | |
| Class2 | 7 | 5 | 6 | 6 | 6 | 6 | | | | | | | | | | | | |

FIG. 9: An exemplary "leaving out" operation

{..
{ 13,    9,   13,   43,   11,   12,    9}
{ 43,    2,   11,   22,   15,   12,   10}
{ 73,    2,   11,   16,   16,   12,    9}
{ 52,   38,    5,   13,   16,   12,   10}
{ 11,   71,    6,   12,   14,   13,   10}
{  3,   50,   35,   10,   14,   13,    9}
{ 11,   12,   68,   11,   13,   13,   10}
{ 13,    3,   74,   12,   11,   15,   10}
~~{ 29,    8,   10,   51,   35,   11,   10}~~
~~{ 41,    8,   10,   37,   28,   13,   10}~~
~~{ 53,    8,   10,   23,   27,   14,    8}~~
~~{ 41,   36,    6,   16,   34,   16,   10}~~
~~{ 14,   57,   11,   11,   31,   18,    9}~~
~~{  7,   39,   37,    9,   18,   19,    9}~~
~~{ 12,    8,   63,   10,   16,   20,    9}~~
~~{ 16,    2,   68,   11,   13,   21,   10}~~
{ 16,   11,   11,   19,   60,   11,   11}
{ 27,   11,   11,   20,   50,   16,   10}
{ 35,   15,   11,   17,   42,   20,   10}
{ 29,   29,   11,   12,   35,   23,   10}
{ 17,   37,   18,    8,   29,   26,    9}
{ 13,   26,   35,    6,   24,   27,    9}
{ 15,    8,   53,    7,   19,   27,   10}
{ 16,    4,   57,    9,   14,   28,   11}
~~{ 12,   11,   11,    6,   51,   36,    8}~~
~~{ 16,   13,   12,    8,   46,   36,    9}~~
~~{ 19,   16,   14,    9,   38,   38,    9}~~
~~{ 19,   21,   16,    8,   32,   38,   10}~~
~~{ 18,   22,   21,    7,   27,   38,   10}~~
~~{ 18,   16,   31,    7,   22,   39,   11}~~
~~{ 18,    9,   41,    6,   18,   29,   11}~~
~~{ 19,    7,   44,    7,   16,   27,   13}~~
{ 11,   12,   11,    9,   18,   64,   10}
{ 11,   12,   13,   10,   18,   61,   11}
{ 13,   13,   15,   10,   17,   58,   12}
{ 15,   14,   17,   10,   16,   56,   13}
{ 17,   14,   20,    9,   14,   55,   13}
{ 18,   11,   26,    9,   13,   52,   14}
{ 19,    9,   31,    8,   11,   50,   15}
{ 19,    9,   33,    8,   10,   46,   17}
~~{ 10,   11,   12,   11,    4,   59,   28}~~
~~{ 11,   10,   13,   11,    4,   60,   26}~~
~~{ 12,   10,   15,   11,    6,   58,   26}~~
~~{ 14,   10,   16,   11,    5,   58,   24}~~
~~{ 15,   10,   18,   11,    4,   57,   24}~~
~~{ 17,    9,   21,   11,    4,   56,   24}~~
~~{ 18,    9,   23,   10,    4,   52,   24}~~
~~{ 19,    9,   26,   10,    5,   49,   25}~~
{ 10,   10,   12,   11,    5,   27,   60}
{ 11,    8,   14,   11,    3,   34,   54}
{ 13,    8,   15,   12,    2,   38,   50}
{ 13,    8,   16,   13,    1,   41,   47}
{ 15,    8,   17,   13,    0,   42,   45}
{ 16,    8,   18,   13,    0,   44,   43}
{ 18,    8,   19,   12,    0,   44,   41}
{ 19,    9,   21,   12,    1,   43,   39}
~~{ 11,    8,   12,   11,    6,    9,   77}~~
~~{ 13,    7,   13,   12,    4,   16,   72}~~
~~{ 15,    6,   14,   13,    2,   21,   67}~~
~~{ 16,    6,   14,   13,    1,   25,   63}~~
~~{ 16,    7,   15,   14,    0,   27,   61}~~
~~{ 16,    8,   16,   14,    0,   28,   58}~~
~~{ 17,    8,   17,   14,    0,   29,   56}~~
~~{ 18,    8,   18,   14,    1,   30,   52}~~
},.'

FIG. 10: An exemplary "leaving out" operation

MATRIX WEIGHTED INTRA PREDICTION OF VIDEO SIGNALS

CROSS REFERENCE TO RELATED APPLICATION

The disclosure claims the benefits of priority to U.S. Provisional Application No. 62/894,489, filed Aug. 30, 2019, which is incorporated herein by reference in its entirety.

TECHNICAL FIELD

The present disclosure generally relates to video processing, and more particularly, to methods and systems for performing simplified matrix weighted intra prediction of video signals.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for performing simplified matrix weighted intra prediction. The method can include: determining a classification of a target block; and generating, based on the classification, a matrix-weighted intra prediction (MIP) signal, wherein determining the classification of the target block comprises: in response to the target block having a size of 4×4, determining that the target block belongs to a first class; or in response to the target block having a size of 8×8, 4×N or N×4, N being an integer between 8 and 64, determining that the target block belongs to a second class.

Embodiments of the present disclosure also provide a system for performing simplified matrix weighted intra prediction. The system can include: a memory for storing a set of instructions; and at least one processor configured to execute the set of instructions for causing the system to perform: determining a classification of a target block; and generating, based on the classification, a matrix-weighted intra prediction (MIP) signal, wherein determining the classification of the target block comprises: in response to the target block having a size of 4×4, determining that the target block belongs to a first class; or in response to the target block having a size of 8×8, 4×N or N×4, N being an integer between 8 and 64, determining that the target block belongs to a second class.

Embodiments of the present disclosure also provide a non-transitory computer readable medium that stores a set of instructions that is executable by at least one processor of a computer system to cause the computer system to perform a method for processing video content. The method can include: determining a classification of a target block; and generating, based on the classification, a matrix-weighted intra prediction (MIP) signal, wherein determining the classification of the target block comprises: in response to the target block having a size of 4×4, determining that the target block belongs to a first class; or in response to the target block having a size of 8×8, 4×N or N×4, N being an integer between 8 and 64, determining that the target block belongs to a second class.

BRIEF DESCRIPTION OF THE DRAWINGS

Embodiments and various aspects of the present disclosure are illustrated in the following detailed description and the accompanying figures. Various features shown in the figures are not drawn to scale.

FIG. 6 illustrates a table including three exemplary classes used in matrix weighted intra prediction, consistent with embodiments of the disclosure.

FIG. 7 illustrates an exemplary look-up table for determining an offset "sO," consistent with embodiments of the disclosure.

FIG. 8 illustrates an exemplary look-up table for determining a shift "sW," consistent with embodiments of the disclosure.

FIG. 9 illustrates an exemplary matrix showing an exemplary leaving-out operation, consistent with embodiments of the disclosure.

FIG. 10 illustrates another exemplary matrix showing another exemplary leaving-out operation, consistent with embodiments of the disclosure.

DETAILED DESCRIPTION

Figure 1:
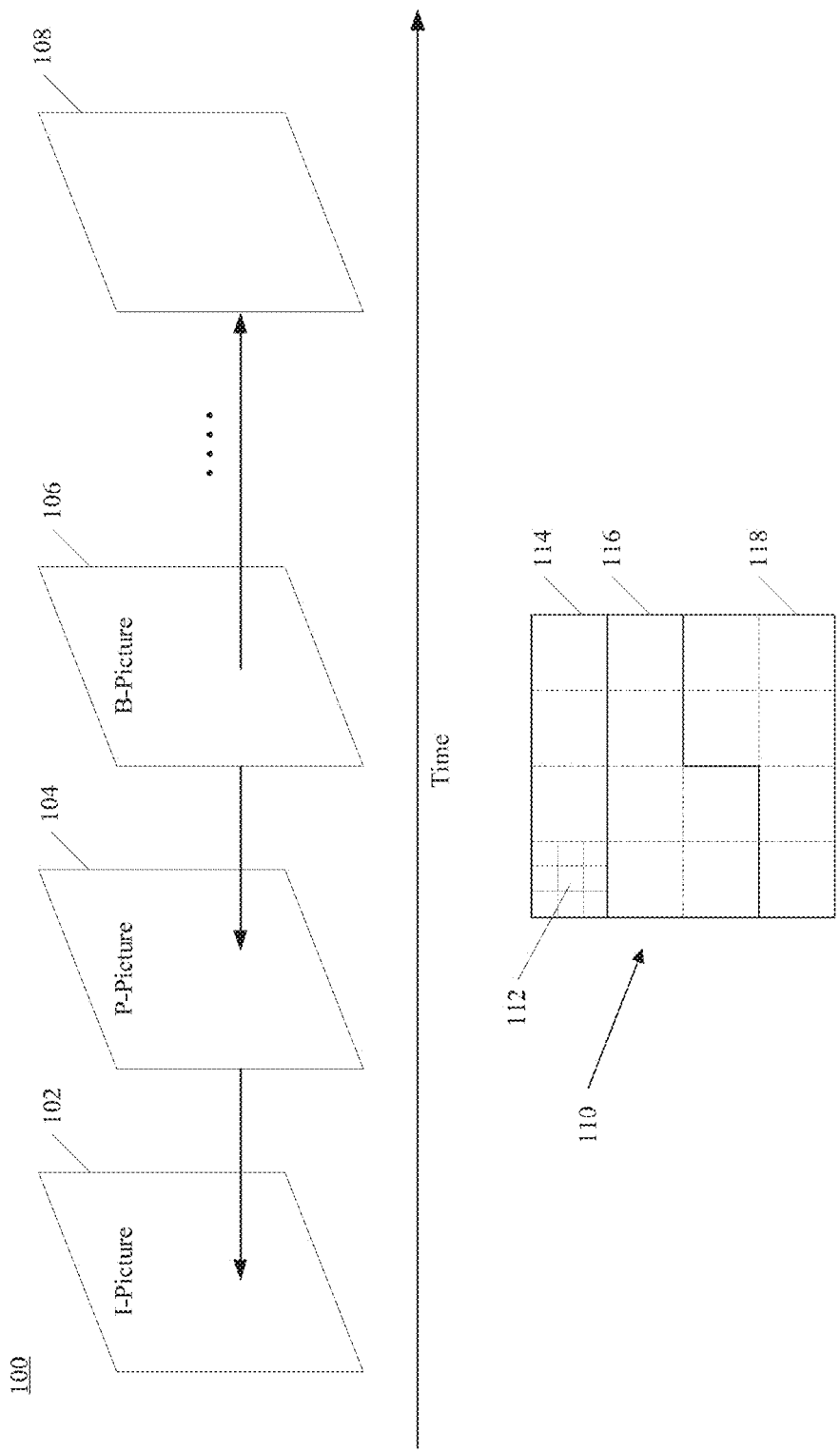
FIG. 1 illustrates structures of an exemplary video sequence, consistent with embodiments of the disclosure, consistent with embodiments of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Video coding systems are often used to compress digital video signals, for instance to reduce storage space consumed or to reduce transmission bandwidth consumption associated with such signals. With high-definition (HD) videos (e.g., having a resolution of 1920×1080 pixels) gaining popularity in various applications of video compression, such as online video streaming, video conferencing, or video monitoring, it is a continuous need to develop video coding tools that can increase compression efficiency of video data.

For example, video monitoring applications are increasingly and extensively used in many application scenarios (e.g., security, traffic, environment monitoring, or the like), and the numbers and resolutions of the monitoring devices keep growing rapidly. Many video monitoring application scenarios prefer to provide HD videos to users to capture more information, which has more pixels per frame to capture such information. However, an HD video bitstream can have a high bitrate that demands high bandwidth for transmission and large space for storage. For example, a monitoring video stream having an average 1920×1080 resolution can require a bandwidth as high as 4 Mbps for real-time transmission. Also, the video monitoring generally monitors 7×24 continuously, which can greatly challenge a storage system, if the video data is to be stored. The demand for high bandwidth and large storage of the HD videos has therefore become a major limitation to its large-scale deployment in video monitoring.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for monitoring, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

Depending on whether the reference picture is the current picture itself or other pictures, the encoding of the current picture can be categorized as "inter prediction" and "intra prediction." Intra prediction can exploit spatial redundancy (e.g., correlation among pixels within one frame) by calculating prediction values through extrapolation from already coded pixels. Inter prediction can exploit temporal differences (e.g., a motion vector) between neighboring frames (e.g., a reference frame and a target frame), enabling the codec of the target frame. The present disclosure relates to techniques used for intra prediction.

This disclosure provides methods, apparatuses, and systems for performing simplified matrix weighted intra prediction of video signals. By removing extra leaving out operations of matrices in the MIP prediction process, the prediction process for blocks with different sizes can be unified and the calculation process can also be simplified.

FIG. 1 illustrates structures of an example video sequence 100, consistent with embodiments of the disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and this disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in this disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which will be detailed in FIGS. 2A-2B and 3A-3B. For each stage, the size of the basic processing units can still be too large for processing, and thus can be further divided into segments referred to as "basic processing sub-units" in this disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which will be detailed in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

As another example, at a prediction stage (an example of which will be detailed in FIG. 2A), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

As another example, at a transform stage (an example of which will be detailed in FIG. 2A), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3-3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and this disclosure does not limit embodiments thereof.

Figure 2A:
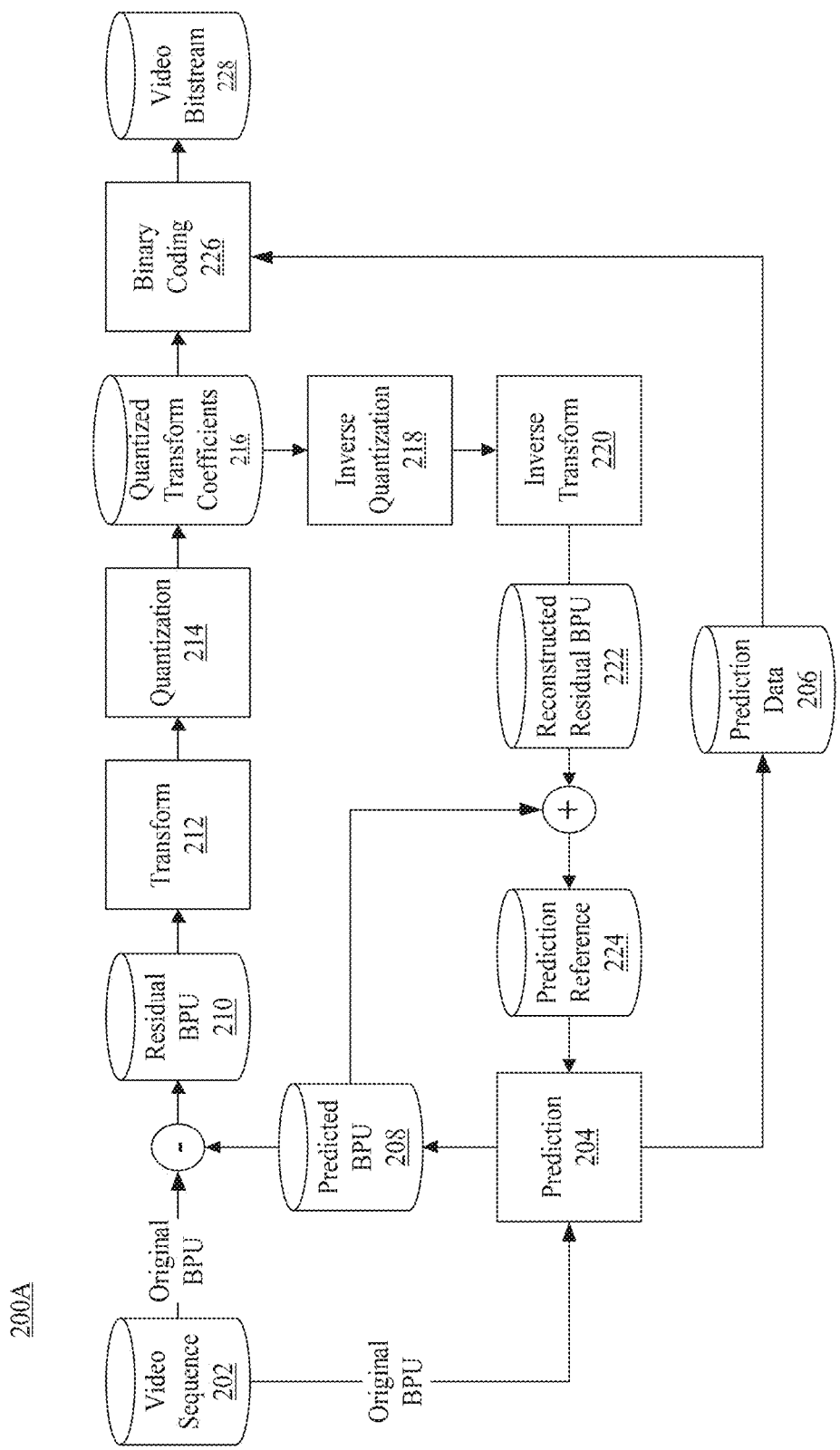
FIG. 2A illustrates a schematic diagram of an exemplary encoding process performed by a hybrid video coding system, consistent with embodiments of the disclosure.

FIG. 2A illustrates a schematic diagram of an example encoding process 200A, consistent with embodiments of the disclosure. An encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
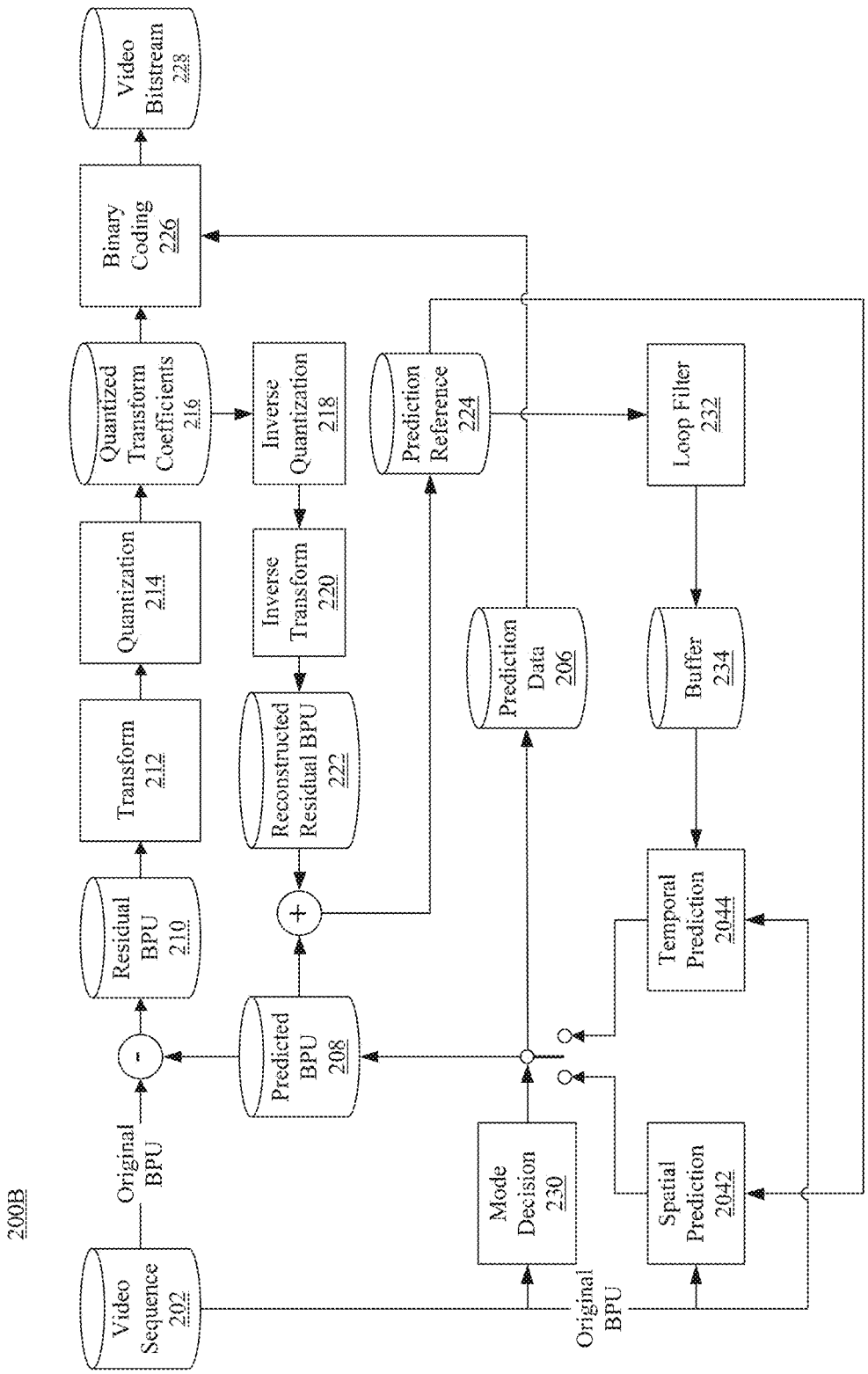
FIG. 2B illustrates a schematic diagram of another exemplary encoding process performed by a hybrid video coding system, consistent with embodiments of the disclosure.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

As another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
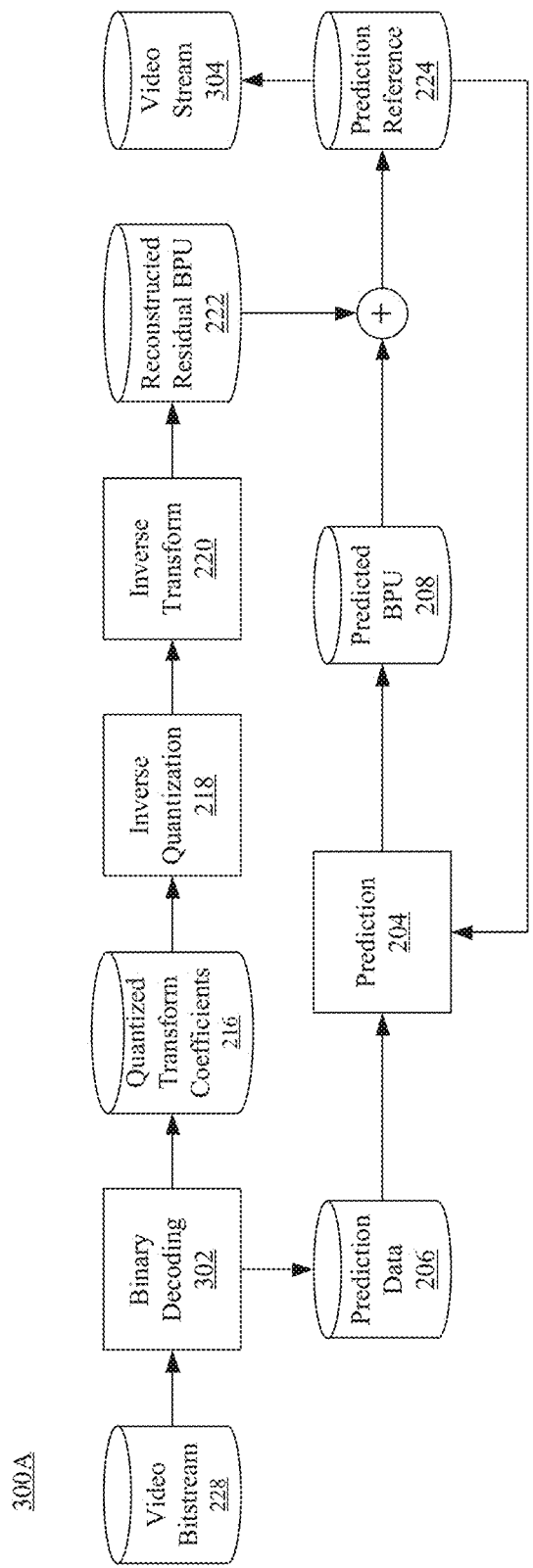
FIG. 3A illustrates a schematic diagram of an exemplary decoding process performed by a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
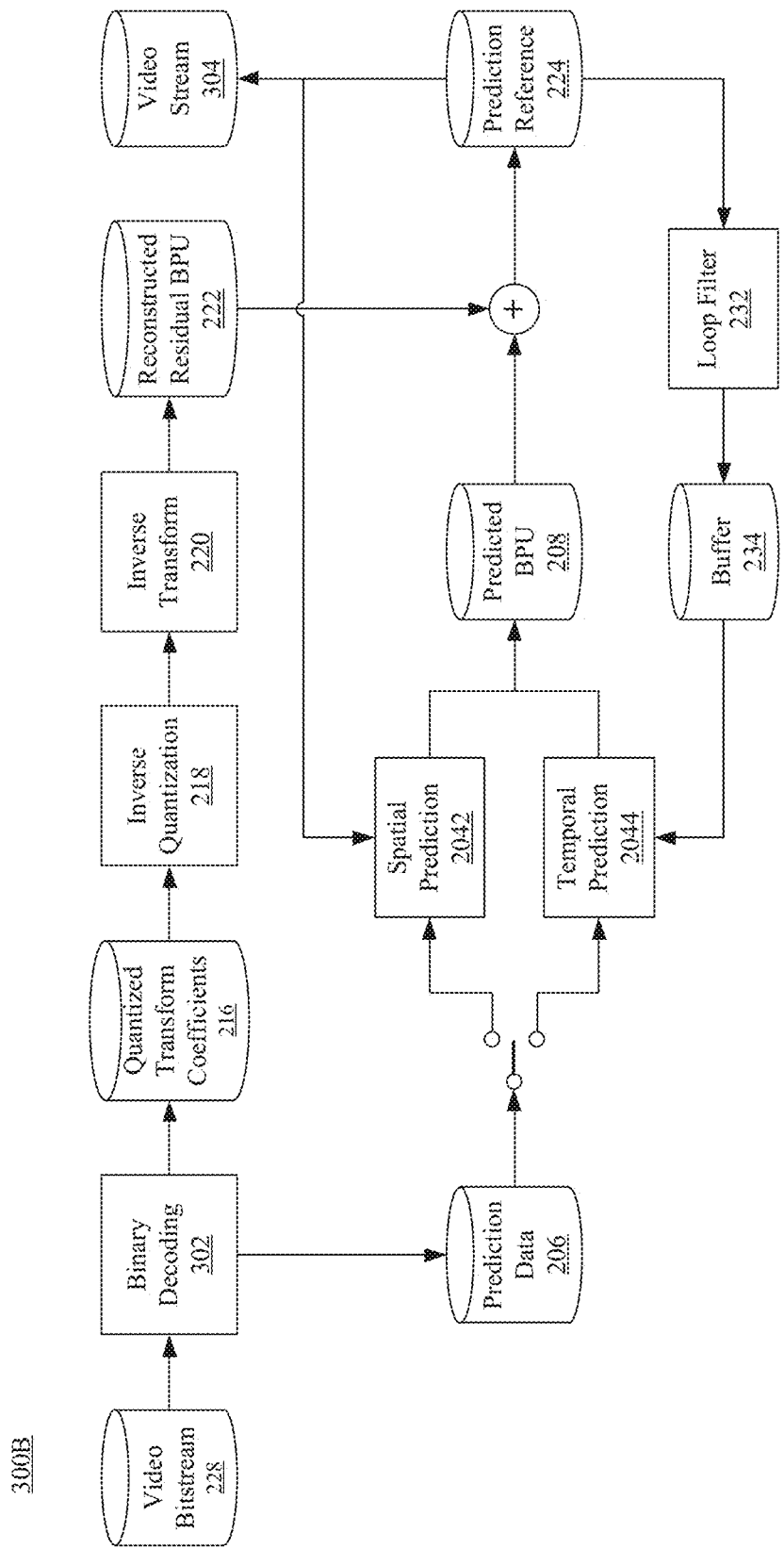
FIG. 3B illustrates a schematic diagram of another exemplary decoding process performed by a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
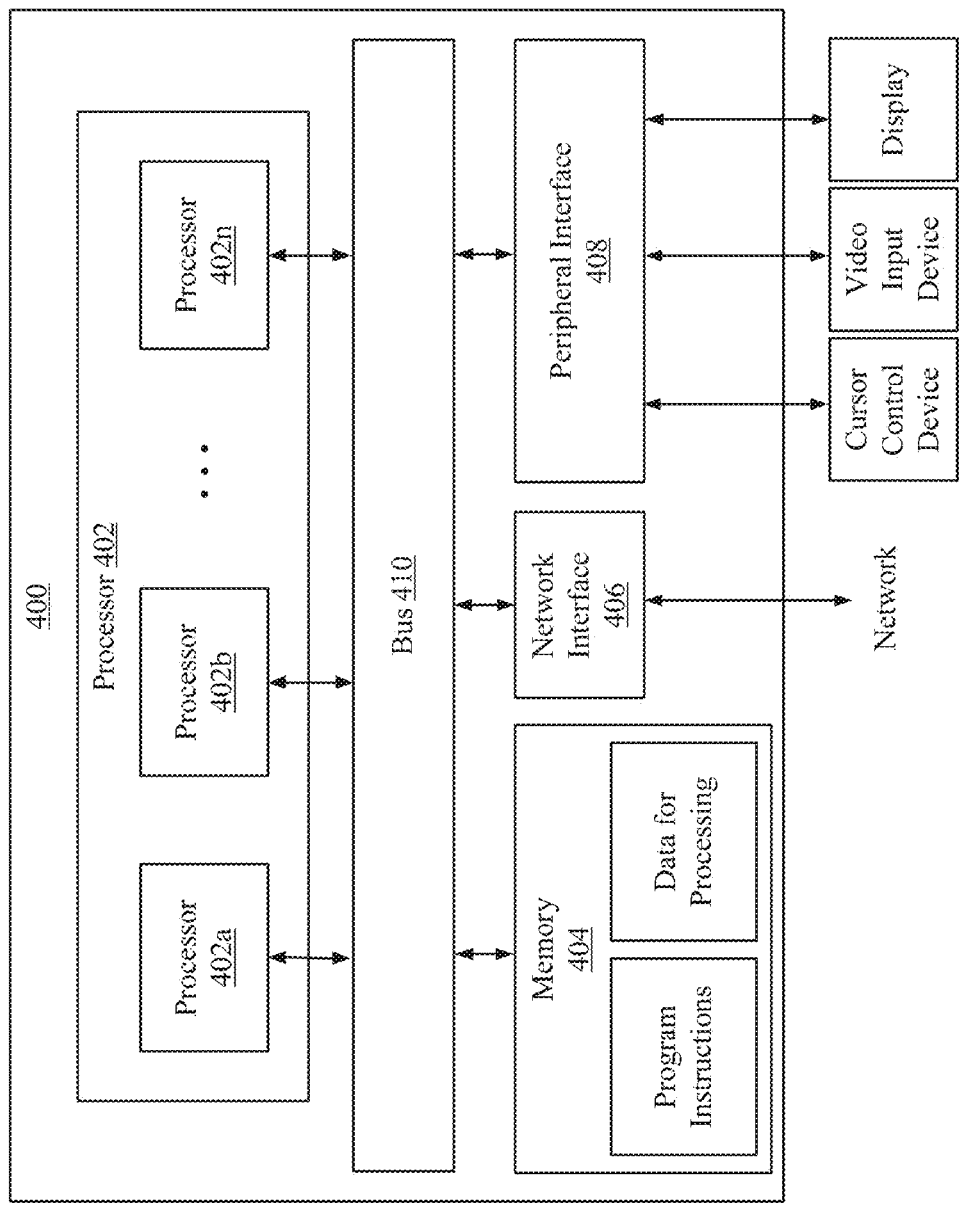
FIG. 4 is a block diagram of an exemplary apparatus for encoding or decoding a video, consistent with embodiments of the disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

The present disclosure provides methods that can be performed by an encoder and/or decoder to simplify matrix weighted intra prediction (MIP). The MIP method is a newly added intra prediction technique in VVC. MP mode is applied to a block whose aspect ratio max(width, height)/min(width, height) is less than or equal to 4. Moreover, it is only applied to the luma component. An MIP flag is signaled in parallel to an intra sub-partition mode, a multiple reference line intra prediction mode or a most probable mode.

Figure 5:
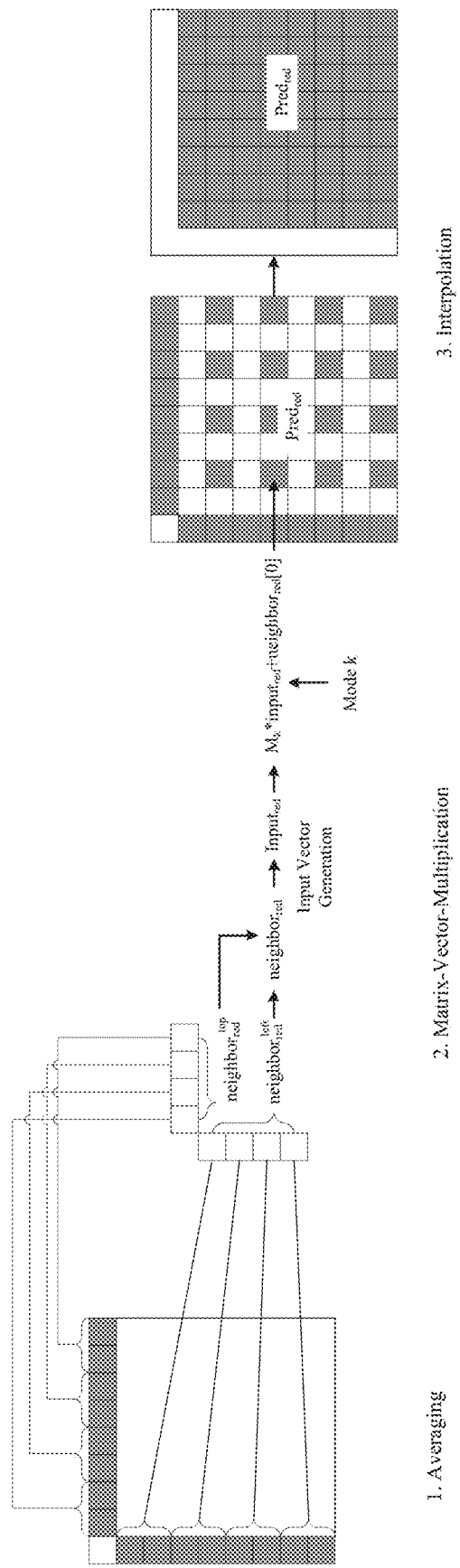
FIG. 5 illustrates an exemplary schematic diagram of matrix weighted intra prediction, consistent with embodiments of the disclosure.

When a block is coded using MIP mode, similar to the conventional intra prediction mode, one line of reconstructed neighboring boundary samples on the left side of the block and one line of reconstructed neighboring boundary samples on top of the block are used as input to predict the block. When the reconstructed neighboring boundary samples are unavailable, they can be generated as in the conventional intra prediction. To predict the luma samples, the reconstructed neighboring boundary samples are firstly averaged to generate a reduced boundary vector $neighbor_{red}$, and $neighbor_{red}[0]$ represents the first element of the reduced boundary vector. Then an input vector $input_{red}$ is generated using the reduced boundary vector $neighbor_{red}$ for a matrix vector multiplication process, and a reduced prediction signal $pred_{red}$ can be obtained. Finally, a bilinear interpolation is applied to the reduced prediction signal $pred_{red}$ to generate the output of MIP prediction signal pred. An illustration of MIP prediction process is shown in FIG. 5.

An MIP block is categorized into three classes according to the block width (W) and height (H):
Class0: for W=H=4 (i.e., 4×4 block);
Class1: for max{W,H}=8 (i.e., 4×8, 8×4, 8×8 blocks); and
Class2: for max{W,H}>8.

As shown in Table 6 of FIG. 6, the differences between the three classes are the number of modes, the number of matrices, the size of the matrices, the size of the input vector $input_{red}$ (the input of matrix vector multiplication process), and the size of reduced prediction signal $pred_{red}$ (the output of matrix vector multiplication process).

In the following description, Class0, Class1 and Class2 are denoted as $S_0$, $S_1$ and $S_2$, respectively. $N_i$ represents the number of matrices in the matrix set $S_i$ (i=0,1,2). For an MIP mode k, the matrix $M_i^j$ is used in matrix multiplication process, where $M_i^j$ represents the j-th matrix in the matrix set $S_i$ and j is derived using below Equation (1).

$$j = \begin{cases} k & \text{if } k < N_i \\ k - N_i + 1 & \text{otherwise} \end{cases} \quad \text{Eq. (1)}$$

It is noted that when the MIP mode k is larger than or equal to $N_i$, a swap operation and a transpose operation is performed in the step of generating the reduced boundary vector $neighbor_{red}$ and the reduced predicted signal $pred_{red}$, respectively. The details of these two operations are described above. Besides, the following Equations (2) and (3) are used to determine whether the swap operation or transpose operation is needed.

$$isSwaped = \begin{cases} 0 & \text{if } k < N_i \\ 1 & \text{otherwise} \end{cases} \quad \text{Eq. (2)}$$

$$isTransposed = \begin{cases} 0 & \text{if } k < N_i \\ 1 & \text{otherwise} \end{cases} \quad \text{Eq. (3)}$$

As mentioned earlier, the generation of the output prediction signal pred for a current block is based on the following three steps, which are averaging, matrix vector multiplication, and linear interpolation. The details of these steps are described as below.

Out of the boundary samples, four samples for Class0 and eight samples for Class1 and Class2 are extracted by averaging. For example, a reduced boundary vector $neighbor_{red}$ can be generated by averaging the reconstructed neighboring boundary samples according to the following rules.

Class0: Every two samples are averaged. The size of the reduced boundary vector $neighbor_{red}$ is 4×1.

Class1 and Class2: For reconstructed neighboring boundary samples above the current block, every W/4 samples are averaged. For reconstructed neighboring boundary samples left of the current block, every H/4 samples are averaged. The size of the reduced boundary vector $neighbor_{red}$ is 8×1.

The reduced boundary vector $neighbor_{red}$ is a concatenation of the vector $neighbor_{red}^{top}$ obtained by averaging the reconstructed neighboring boundary samples above the current block and the vector $neighbor_{red}^{left}$ obtained by averaging the reconstructed neighboring boundary samples left of the current block. As described above, for a MIP mode k greater than or equal to $N_i$, the swap operation is performed. For example, the order of concatenating the two vectors neighbor$_{red}^{top}$ and neighbor$_{red}^{left}$ can be swapped, as shown in the following Equation (4).

$$neighbor_{red} = \begin{cases} [neighbor_{red}^{top}, neighbor_{red}^{left}] & \text{for } isSwaped = 0 \\ [neighbor_{red}^{left}, neighbor_{red}^{top}] & \text{for } isSwaped = 1 \end{cases} \quad \text{Eq. (4)}$$

Then, the input vector for matrix vector multiplication input$_{red}$ is generated as follows.

For Class0 and Class1:

$$input_{red}[0] = neighbor_{red}[0] - (1 << (bitDepth-1)), input_{red}[j] = neighbor_{red}[j] - neighbor_{red}[0], j = 1, \ldots, size(neighbor_{red}) - 1, \quad \text{Eq. (5)}$$

For Class2:

$$input_{red}[j] = neighbor_{red}[j+1] - neighbor_{red}[0], j = 0, \ldots, size(neighbor_{red}) - 2, \quad \text{Eq. (6)}$$

In the above Equations (5) and (6), neighbor$_{red}$[0] represents the first element of the vector neighbor$_{red}$. According to the Equations (5) and (6), the size inSize of input$_{red}$ for Class0, Class1, and Class2 are 4, 8 and 7, respectively.

A matrix vector multiplication is carried out with the vector input$_{red}$ as an input. The result is a reduced prediction signal pred$_{red}$ on a sub-sampled set of samples in the current block. For example, out of the reduced input vector input$_{red}$, a reduced prediction signal pred$_{red}$, which is a signal on the downsampled block of width W$_{red}$ and height H$_{red}$, can be generated. Here, W$_{red}$ and H$_{red}$ are defined as Equations (7) and (8) below:

$$W_{red} = \begin{cases} 4 & \text{for Class0 and Class1} \\ \min(W, 8) & \text{for Class2} \end{cases} \quad \text{Eq. (7)}$$

$$H_{red} = \begin{cases} 4 & \text{for Class0 and Class1} \\ \min(H, 8) & \text{for Class2} \end{cases} \quad \text{Eq. (8)}$$

As mentioned earlier, when the variable "isTransposed" is equal to 1, the reduced prediction signal pred$_{red}$ is transposed. Assuming that the size of final reduced prediction signal pred$_{red}$ is W$_{red}$×H$_{red}$, the size of untransposed pred$_{red}^T$, W'$_{red}$×H'$_{red}$, is derived as the following Equations (9) and (10):

$$W'_{red} = \begin{cases} W_{red} & \text{for } isTransposed = 0 \\ H_{red} & \text{for } isTransposed = 1 \end{cases} \quad \text{Eq. (9)}$$

$$H'_{red} = \begin{cases} H_{red} & \text{for } isTransposed = 0 \\ W_{red} & \text{for } isTransposed = 1 \end{cases} \quad \text{Eq. (10)}$$

A vector of reduced prediction signal pred'$_{red}$ is computed by calculating a matrix vector product according to the below Equation (11):

$$pred'_{red} = M \cdot input_{red} + neighbor_{red}[0] \quad \text{Eq. (11)}$$

Then, the vector pred'$_{red}$ is arranged in a matrix pred$_{red}$ of size 4×4, 4×8, 8×4, and 8×8 according to raster scan order. An example of arranging the vector pred'$_{red}$ of size 16×1 in the matrix pred$_{red}$ of size 4×4 is shown as below:

$$pred'_{red} = [A, B, C, D, E, F, G, H, I, J, K, L, M, N, O, P]^T$$

$$pred_{red} = \begin{bmatrix} A & B & C & D \\ E & F & G & H \\ I & J & K & L \\ M & N & O & P \end{bmatrix}$$

In other words, the matrix pred$_{red}$ can be calculated using the Equation (12) as follows for x=0 ... W'$_{red}$−1 and y=0 ... H'$_{red}$−1

$$pred_{red}[x][y] = ((\Sigma_{i=0}^{inSize-1} M[i][y \times incH \times predC + x \times incW] \times input_{red}[i] * oW) >> sW) + neighbor_{red}[0] \quad \text{Eq. (12)}$$

In the above Equation (12), the variable "inSize" is the size of input vector input$_{red}$ as described above, the matrix M used to generate the reduced prediction signal pred$_{red}$ is obtained from one of the three matrices sets $S_0$, $S_1$, $S_2$ according to block size classification and the MIP mode k.

The variables oW and sW are two predefined values depending on which matrix is used for matrix vector multiplication. The variable oW is used to limit the precision of each element in matrix to 7 bits and is used so that all elements are greater than or equal to 0. For example, the factor oW can be defined as the following Equation (13):

$$oW = (1 << (sW-1)) - sO \cdot (\Sigma_{i=0}^{inSize-1} input_{red}[i]) \quad \text{Eq. (13)}$$

In the above Equation (13), sO is an offset and is derived from a lookup table. For example, Table 7 of FIG. 7 shows an exemplary lookup table for sO, according to some disclosed embodiments.

Moreover, the variable "sW" is derived using another lookup table. Table 8 of FIG. 8. shows an exemplary lookup table for sW, according to some disclosed embodiments.

In the Equation (12), the two variables "incH" and "incW", which are used to leave out half of rows of matrix for 4×16 and 16×4 blocks, are defined as the following Equations (14) and (15):

$$incH = \begin{cases} 1 & \text{for } W'_{red} \geq predC \\ 2 & \text{for } W'_{red} < predC \end{cases} \quad \text{Eq. (14)}$$

$$incW = \begin{cases} 1 & \text{for } H'_{red} \geq predC \\ 2 & \text{for } H'_{red} < predC \end{cases} \quad \text{Eq. (15)}$$

In the above Equation (15), the variable predC is used to arrange the reduced prediction signal pred$_{red}$ into a matrix of W'$_{red}$×H'$_{red}$ and is defined as the following Equation (16):

$$predC = \begin{cases} 4 & \text{for Class0 and Class1} \\ 8 & \text{for Class2} \end{cases} \quad \text{Eq. (16)}$$

The input vector input$_{red}$ with size inSize equal to 7 and the matrices with 64 rows and 7 columns are used for blocks belonging to Class2, and a 64-elements vector is generated. However, only 32 elements are needed for 4×16 and 16×4 blocks according to Equations (7) and (8). This is because the reduced prediction signal pred$_{red}$ for Class2 can be arranged in 8×8, which exceeds the short side of 4×16 or 16×4 blocks. Therefore, the leave out operation is performed.

FIG. 9 illustrates an exemplary leave out operation, according to some disclosed embodiments. As shown in FIG. 9, for 4×16 blocks with isTransposed=0 and 16×4 blocks with isTransposed=1, the second row for every two rows is left out of the matrix. Therefore, the reduced prediction signal pred$_{red}$ contains 32 elements, and these elements are arranged in the size of 4×8.

FIG. 10 illustrates an exemplary leave out operation, according to some disclosed embodiments. As shown in FIG. 10, for 16×4 blocks with isTransposed=0 and 4×16 blocks with isTransposed=1, the last 8 rows of every 16 rows are left out of the matrix. Therefore, the reduced prediction signal pred$_{red}$ contains 32 elements, and these elements are arranged in the size of 8×4.

The output prediction signal at the remaining positions is generated from the reduced prediction signal on the sub-sampled set pred$_{red}$ by linear interpolation, which is a single step linear interpolation in each direction.

As explained above, the prediction of MIP mode is generated using three steps, which include averaging of neighboring reconstructed samples, matrix vector multiplication, and bilinear interpolation. The prediction processes of MIP mode are different from the processes of the conventional intra prediction modes. Although the MIP mode improve the coding efficiency, the design may be complicated in the following two aspects.

Regarding the first aspect, the leaving out operation for 4×16 and 16×4 blocks in the matrix vector multiplication process may be problematic, for the following three reasons. First, the leaving-out operation not only adds extra operations but also makes the prediction process not uniform, because the leaving-out operation is only applied to 16×4 and 4×16 blocks. Second, for the 16×4 and 4×16 blocks, the size of the reduced prediction signal pred$_{red}$ can be different before and after transposition. Therefore, additional derivation for the size of untransposed reduced prediction signals (e.g., W'$_{red}$ and H'$_{red}$) is required. Third, the size of the reduced prediction signal pred$_{red}$ can be different for the 16×4 and 4×16 blocks, as shown in below Equation (17).

$$W_{red} \times H_{red} = \begin{cases} 4\times 4 & \text{for Class0 and Class1} \\ 4\times 8 & \text{for } 4\times 16 \text{ blocks} \\ 8\times 4 & \text{for } 16\times 4 \text{ blocks} \\ 8\times 8 & \text{for other blocks in Class2} \end{cases} \quad \text{Eq. (17)}$$

Regarding the second aspect, to limit the precision of each element in matrices to 7 bits and guarantee all the elements are non-negative, an offset sO is added to the reduced prediction signal in the matrix multiplication process. However, it may be unnecessary and complicated, for the following three reasons. First, extra memory is needed to store a table of the offset sO. The table contains a total of 34 elements, each of which is 7 bits. Therefore, in total 238 bits memory are needed. Second, a look up table operation is needed to determine the value of sO using class index and matrix number. Third, additional multiplication and addition operations are required to generate reduced prediction signal pred$_{red}$. In addition to calculating matrix vector multiplication between the matrix M and the input vector input$_{red}$, the multiplication between sO and the input vector input$_{red}$ is further performed. For a 4×4 block, a total number of multiplications per sample needed to generate prediction signal is increased to 5.

The present disclosure provides methods solving these issues without affecting bitrate. In some exemplary methods, 8 bits instead of 7 bits are used to store the matrices. Then, the Equation (12) can be re-expressed as the following Equation (18).

$$\text{pred}_{red}[x][y] = ((\Sigma_{i=0}^{inSize-1}((M[i][y\times incH\times predC + x\times incW] - sO)*\text{input}_{red}[i]) + (1<<(sW-1)))>>sW) + \text{neighbor}_{red}[0] \quad \text{Eq. (18)}$$

In the above Equation (18), all the elements in matrices are subtracted by the offset sO. The aforementioned method of storage and computation of the matrix-vector product can produce bit-identical results. However, a number of bits to store matrices are increased by 4882 (i.e., 5120×1−34×7) bits, and the bit-width for multiplication operation is enlarged to 8 bits.

Methods for removing the leaving out operation and the lookup table for sO are described below.

To remove the extra leaving out operations of matrices in the MIP prediction process, two methods are provided. According to a first method for removing the leave out operation, the unreasonable classification method in the conventional MIP method may be modified by moving the 4×16 and 16×4 blocks from Class2 to Class1, so that the generated reduced prediction signal pred$_{red}$ does not exceed the short-side limitation.

In an exemplary embodiment, the rules of MIP classification are modified as follows:
Class0: 4×4;
Class1: 4×N, 8×8, and N×4, with N being an integer between 8 and 64; and
Class2: others.

With this modification, blocks with a size of 8×8, 4×8, 4×16, 4×32, 4×64, 8×4, 16×4, 32×4, or 64×4 can be moved from Class2 to Class1. Therefore, the blocks with a size of 8×8, 4×8, 4×16, 4×32, 4:64, 84, 16×4, 32×4, or 64×4 can use the matrices in set S$_1$, each of which having 16 rows and 8 columns in the matrix multiplication process. By this way, only 16 elements are generated to form a 4×4 reduced prediction signal pred$_{red}$, so that the leaving out operations can be removed. This modification can be expressed as follow with changes highlighted in double strikethrough or italic:
If both cbWidth and cbHeight are equal to 4, MipSizeId [x][y] is set equal to 0.
Otherwise, if cbWidth*cbHeight is less than or equal to 64, MipSizeId[x][y] is set equal to 1.
Otherwise, MipSizeId[x][y] is set equal to 2.
There are at least three benefits of this solution.

First, the matrix multiplication process is simplified and unified. For blocks of size 4×16 or 16×4, the leaving out operation is removed. Therefore, the checking of whether to perform the leaving out operations and the two variables "inch" and "incW" can be deleted. Furthermore, all blocks do not require additional operations on the matrix during matrix vector multiplication process. Therefore, the matrix multiplication process is unified.

Second, the number of multiplications and additions of 4×16 and 16×4 blocks in matrix multiplication process is reduced. In some embodiments, for a block of size 4×16 or 16×4, a 32×7 matrix can be used to perform matrix vector multiplication while a 16×8 matrix can be used in the provided embodiments. Therefore, the number of multiplications and additions of 4×16 or 16×4 blocks can be reduced.

Third, the derivation of pred$_{red}$ is simplified and unified. For all blocks, the size of reduced prediction signal pred$_{red}$ is consistent before and after transposition. So additional derivation for W'$_{red}$ and H'$_{red}$ is removed. For example, the derivation of the size of pred$_{red}$ can be simplified as the following Equations (19) and (20).

$$W_{red} = \begin{cases} 4 & \text{for Class0 and Class1} \\ 8 & \text{for Class2} \end{cases} \quad \text{Eq. (19)}$$

$$H_{red} = \begin{cases} 4 & \text{for Class0 and Class1} \\ 8 & \text{for Class2} \end{cases} \quad \text{Eq. (20)}$$

And the size of reduced prediction signal pred$_{red}$ is unified by the following Equation (21):

$$W_{red} \times H_{red} = \begin{cases} 4 \times 4 & \text{for Class0 and Class1} \\ 8 \times 8 & \text{for Class2} \end{cases} \quad \text{Eq. (21)}$$

According to a second method for removing the leave out operation, the rules of MIP classification are modified as follows:

Class0: 4×4;
Class1: 4×8, 8×4, 4×16 and 16×4; and
Class2: others.

The 4×16 and 16×4 blocks (italicized in the above modified MIP classification) are moved to Class1 and the 8×8 block is moved to Class2. With this modification, the leaving out operation is removed and the rules of MIP classification are further simplified. In some embodiments, this modification can be expressed below with changes highlighted in double strikethrough or italics.

If both cbWidth and cbHeight are equal to 4, MipSizeId[x][y] is set equal to 0.
Otherwise, if Min(cbWidth, cbHeight) is equal to 4, MipSizeId[x][y] is set equal to 1.
Otherwise, MipSizeId[x][y] is set equal to 2.

To remove the table of the offset sO, embodiments of the present disclosure provide methods for modifying the value of the matrix M and the offset sO, without the lookup tables.

In a first exemplary embodiment, the offset sO is replaced with the first element in the matrix $M_0^j$ (j=0 . . . 17) for Class0, the first element in the matrix $M_1^j$ (j=0 . . . 9) for Class1 and the seventh element in the matrix $M_2^j$ (j=0 . . . 5) for Class2. The i-th element in the matrix represents the i-th number counting in raster scan order and starting from top-left corner of the matrix. By doing this, the lookup table of the offset sO depending on class index and matrix number shown in Table 7 of FIG. 7 can be removed. Then 238 bits memory space can be saved.

In a second exemplary embodiment, the offset sO is replaced with the first element in each matrix for all classes. In addition, because the first element of the matrix $M_2^i$ (i=0 . . . 5) used for Class2 has a relative larger difference from the corresponding sO$_i$ in Table 7 of FIG. 7, the elements other than the first element are modified using the below Equation (22) for x=0 . . . 6, y=0 . . . 63.

$$M_2^i[x][y] = M_2^i[x][y] - sO_i + M_2^i[0][0] \quad \text{Eq. (22)}$$

The modified matrices are stored instead of the original matrices, and no additional operations are added during the encoding and decoding processes. There are at least two benefits as below. First, the table of the offset sO depending on class index and matrix number can be removed so that 238 bits memory space can be saved. Second, the process of extracting offset from the matrices is unified for all classes.

In a third exemplary embodiment, the first element of each matrix is replaced with the corresponding offset sO according to Table 7 of FIG. 7. And the table of sO can be thus removed. When performing the matrix vector multiplication, the offset is derived from the first element of each matrix. The modified matrices are stored instead of the original matrices, and no additional operations are added during the encoding and decoding processes.

In a fourth exemplary embodiment, the offset sO is replaced with a fixed value. So the lookup table can be removed without any derivation process for the offset. In one example, the fixed value is 66, which is the smallest value in among all the matrices. All the matrices are modified as follow.

$$M' = M - sO + 66 \quad \text{Eq. (23)}$$

In the above Equation (23), sO is derived from Table 7 (FIG. 7). Then, the matrix vector multiplication process in Equation (12) can be modified as follow.

$$\text{pred}_{red}[x][y] = ((\Sigma_{i=0}^{inSize-1} M[i][y \times incH \times predC + x \times incW] \times \text{input}_{red}[i] + (1 << (sW-1)) - 66 \cdot (\Sigma_{i=0}^{inSize-1} \text{input}_{red}[i])) >> sW) + \text{neighbor}_{red}[0] \quad \text{Eq. (24)}$$

The modified matrices M' are stored instead of the original matrices, and no additional operations are added during the encoding and decoding processes.

As another example, the fixed value is 64. All the matrices are modified as follow.

$$M' = M - sO + 64 \quad \text{Eq. (25)}$$

In the above Equation (25), sO is derived from Table 7. Then, the matrix vector multiplication process can be modified as following.

$$\text{pred}_{red}[x][y] = ((\Sigma_{i=0}^{inSize-1} M[i][y \times incH^* predC + x \times incW] \times \text{input}_{red}[i] + (1 << (sW-1)) - (\Sigma_{i=0}^{inSize-1} \text{input}_{red}[i]) << 6) >> sW) + \text{neighbor}_{red}[0] \quad \text{Eq. (26)}$$

In addition, negative number in the modified matrix need to be modified to 0. When implementing embodiments of the disclosure, only one value is changed from −2 to 0. The modified matrices M' are stored instead of the original matrices, and no additional operations are added during the encoding and decoding processes. The operation multiplied by 64 can be replaced with a shift operation. Therefore, the multiplication between sO and the input vector input$_{red}$ can be replaced with left shift operation. For 4×4 blocks, a total number of multiplications per sample needed to generate prediction signal is reduced to 4 from 5.

In a third example, the fixed value is 128. All the matrices are modified as follow.

$$M' = M - sO + 128 \quad (27)$$

In the above Equation (27), sO is derived from Table 7. Then the matrix vector multiplication process can be modified as follow.

$$\text{pred}_{red}[x][y] = ((\Sigma_{i=0}^{inSize-1} M[i][y \times incH \times predC + x \times incW]^* \text{input}_{red}[i] + (1 << (sW-1)) - (\Sigma_{i=0}^{inSize-1} \text{input}_{red}[i]) << 7) >> sW) + \text{neighbor}_{red}[0] \quad (28)$$

The modified matrices M' are stored instead of the original matrices, and no additional operations are added during the encoding and decoding processes. The lookup table is removed, and the multiplication between offset and the input vector is replaced with left shift operation. For 4×4 blocks, a total number of multiplications per sample needed to generate prediction signal is reduced to 4. Besides, the coding performance is unchanged.

Figure 11:
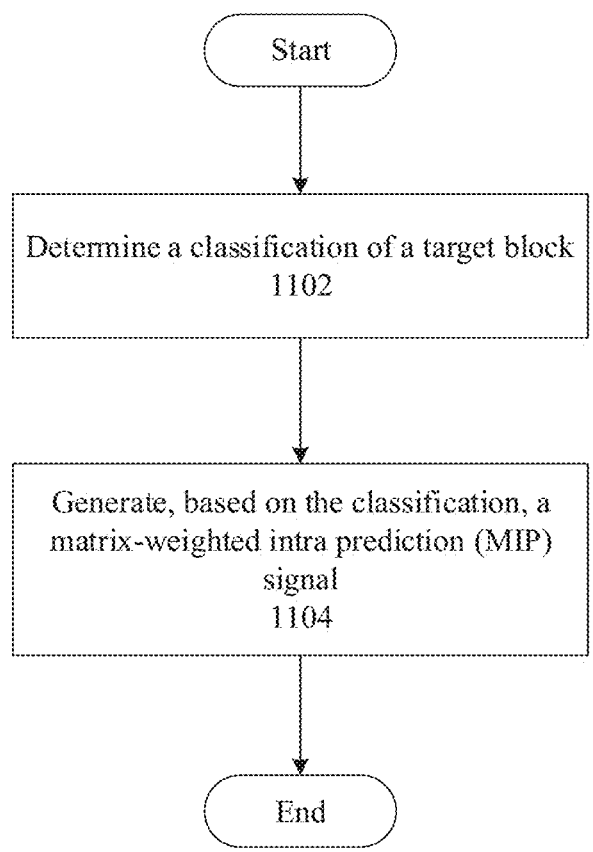
FIG. 11 is a flowchart of an exemplary method for processing video content, consistent with embodiments of the disclosure.

FIG. 11 is a flowchart of an exemplary method 1100 for processing video content, consistent with embodiments of the disclosure. Method 1100 can be performed by a codec (e.g., an encoder using encoding processes 200A and 200B of FIGS. 2A-2B or a decoder using decoding processes 300A and 300B of FIGS. 3A-3B). For example, the codec can be implemented as one or more software or hardware components of an apparatus (e.g., apparatus 400) for encoding or transcoding a video sequence. In some embodiments, the video sequence can be an uncompressed video sequence (e.g., video sequence 202) or a compressed video sequence that is decoded (e.g., video stream 304). In some embodiments, the video sequence can be a monitoring video sequence, which can be captured by a monitoring device (e.g., the video input device in FIG. 4) associated with a processor (e.g., processor 402) of the apparatus. The video sequence can include multiple pictures. The apparatus can perform method 1100 at the level of pictures. For example, the apparatus can process one picture at a time in method 1100. For another example, the apparatus can process a plurality of pictures at a time in method 1100. Method 1100 can include steps as below.

At step 1102, a classification of a target block can be determined. In some embodiments, the classification can include a first class (e.g., Class 0), a second class (e.g., Class 1), and a third class (e.g., Class 2). For a given block, the classification of the given block can be determined based on a size of the given block. For example, the first class can be associated with a block in a size of 4×4, the second class can be associated with a block in a size of 8×8, 4×N or N×4, N can be an integer between 8 and 64. For example, the N is equal to 8, 16, 32, or 64. That is, the second class can include a block in a size of 8×8, 4×8, 4×16, 4×32, 4×64, 8×4, 16×4, 32×4, or 64×4. And the third class can be associated with the rest of blocks.

In some embodiments, in response to the target block having a size other than 4×4, 8×8, 4×N or N×4, it can be determined that the target block belongs to a third class.

At step 1104, a matrix-weighted intra prediction (MIP) signal can be generated based on the classification. In some embodiments, a first intra prediction signal for the target block can be generated based on an input vector, a matrix, and the classification of the target block, and bilinear interpolation can be performed on the target block using the first intra prediction signal, to generate the MIP signal.

For example, to generate the input vector, neighboring reconstructed samples of the target block can be average according to the classification of the target block. As discussed above, for a block of the first class, every two neighboring reconstructed samples of the block can be averaged to generate a reduced boundary vector as the input vector. For example, a size of the input vector can be in 4×1 for the first class, 8×1 for the second class, and 7×1 for the third class. And for a block (e.g., with a size of M×N) of the second class or the third class, every M/4 neighboring reconstructed samples above the block and every N/4 neighboring reconstructed samples on the left of the block can be averaged.

Unlike the input vector, the matrix can be selected from a set of matrices (e.g., matrix sets $S_0$, $S_1$, or $S_2$), according to the classification of the target block and an MIP mode index.

Then, the first intra prediction signal can be generated by performing matrix vector multiplication on the matrix and the input vector. In some embodiments, the first intra prediction signal is further associated with a first offset and a second offset. For example, as discussed with Equation (12), the reduced prediction signal can be further biased by the first offset (e.g., oW) and the second offset (e.g., oS). In some embodiments, the first offset and the second offset can determined based on a matrix index in the set of matrices.

For example, the first offset and the second offset can be determined by referring to Table 7 and Table 8, respectively.

The classification of the target block is also related to the size of the first intra prediction signal. For example, in response to the target block belonging to the first class or the second class, determining that the first intra prediction signal has a size of 4×4; and in response to the target block belonging to the third class, determining that the first intra prediction signal has a size of 8×8.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A computer-implemented method for processing video content, comprising:
   determining a classification of a target block; and
   generating, based on the classification, a matrix-weighted intra prediction (MIP) signal,
   wherein determining the classification of the target block comprises:
   in response to the target block having a size of 4×4, determining that the target block belongs to a first class; or
   in response to the target block having a size of 8×8, 4×N, or N×4, N being an integer between 8 and 64, determining that the target block belongs to a second class.

2. The method according to clause 1, wherein generating the MIP signal comprises:
   generating a first intra prediction signal for the target block, the generating of the first intra prediction signal being based on an input vector, a matrix, and the classification of the target block; and
   performing bilinear interpolation on the target block using the first intra prediction signal, to generate the MIP signal.

3. The method according to clause 1 or 2, further comprising:
   averaging, according to the classification of the target block, neighboring reconstructed samples of the target block, to generate the input vector.

4. The method according to clause 2 or 3, wherein the input vector has a size of 4×1 when the target block belongs to the first class or a size of 8×1 when the target block belongs to the second block.

5. The method according to any one of clauses 2-4, wherein the matrix is selected from a set of matrices, according to the classification of the target block and an MIP mode index.

6. The method according to clause 5, wherein the first intra prediction signal is generated by performing matrix vector multiplication on the matrix and the input vector.

7. The method according to clause 6, wherein the first intra prediction signal is generated based on one or more offsets associated with the matrix.

8. The method according to clause 7, wherein the one or more offsets are determined based on an index of the matrix in a lookup table.

9. The method according to any one of clauses 1-8, wherein determining the classification of the target block further comprises:

in response to the target block having a size other than 4×4, 8×N, 4×N, and N×4, determining that the target block belongs to a third class.

10. The method according to clause 9, wherein generating the first intra prediction signal for the target block comprises:

in response to the target block belonging to the first class or the second class, determining that the first intra prediction signal has a size of 4×4; and in response to the target block belonging to the third class, determining that the first intra prediction signal has a size of 8×8.

11. The method according to any one of clauses 1-10, wherein the N is equal to 8, 16, 32, or 64.

12. A system for processing video content, comprising:
a memory for storing a set of instructions; and
at least one processor configured to execute the set of instructions for causing the system to perform:
determining a classification of a target block; and
generating, based on the classification, a matrix-weighted intra prediction (MIP) signal,
wherein in determining the classification of the target block, the at least one processor is further configured to execute the set of instructions for causing the system to further perform:
in response to the target block having a size of 4×4, determining that the target block belongs to a first class; or
in response to the target block having a size of 8×8, 4×N, or N×4, N being larger than 4, determining that the target block belongs to a second class.

13. The system according to clause 12, wherein in generating the MIP signal, the at least one processor is further configured to execute the set of instructions for causing the system to further perform:
generating a first intra prediction signal for the target block, the generating of the first intra prediction signal being based on an input vector, a matrix, and the classification of the target block; and
performing bilinear interpolation on the target block using the first intra prediction signal, to generate the MIP signal.

14. The system according to clause 12 or 13, wherein the at least one processor is further configured to execute the set of instructions for causing the system to further perform:
averaging, according to the classification of the target block, neighboring reconstructed samples of the target block, to generate the input vector.

15. The system according to clause 13 or 14, wherein the input vector has a size of 4×1 when the target block belongs to the first class or a size of 8×1 when the target block belongs to the second block.

16. The system according to any one of clauses 13-15, wherein the matrix is selected from a set of matrices, according to the classification of the target block and an MIP mode index.

17. The system according to clause 16, wherein the first intra prediction signal is generated by performing matrix vector multiplication on the matrix and the input vector.

18. The system according to clause 17, wherein the first intra prediction signal is generated based on one or more offsets associated with the matrix.

19. The system according to clause 18, wherein the one or more offsets are determined based on an index of the matrix in a lookup table.

20. A non-transitory computer readable medium that stores a set of instructions that is executable by at least one processor of a computer system to cause the computer system to perform a method for processing video content, the method comprising:
determining a classification of a target block; and
generating, based on the classification, a matrix-weighted intra prediction (MP) signal,
wherein determining the classification of the target block comprises:
in response to the target block having a size of 4×4, determining that the target block belongs to a first class; or
in response to the target block having a size of 8×8, 4×N, or N×4, N being an integer between 8 and 64, determining that the target block belongs to a second class.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented method for processing video content, the method implemented in an encoder and comprising:
   determining a classification of a target block, wherein:
      the target block is classified into a first class when the target block has a size of 4×4,
      the target block is classified into a second class when the target block has a size of 8×8, 4×8, or 8×4, and
      the target block is classified into the second class when the target block has a size of 4×N or N×4, wherein N is 16, 32, or 64; and
   generating, based on the classification, a matrix-weighted intra prediction (MIP) signal.

2. The method according to claim 1, wherein generating the MIP signal comprises:
   generating a first intra prediction signal for the target block, the generating of the first intra prediction signal being based on an input vector, a matrix, and the classification of the target block; and
   performing bilinear interpolation on the target block using the first intra prediction signal, to generate the MIP signal.

3. The method according to claim 1, further comprising:
   averaging, according to the classification of the target block, neighboring reconstructed samples of the target block, to generate the input vector.

4. The method according to claim 2, wherein the input vector has a size of 4×1 when the target block belongs to the first class or a size of 8×1 when the target block belongs to the second class.

5. The method according to claim 2, wherein the matrix is selected from a set of matrices, according to the classification of the target block and an MIP mode index.

6. The method according to claim 5, wherein the first intra prediction signal is generated by performing matrix vector multiplication on the matrix and the input vector.

7. The method according to claim 6, wherein the first intra prediction signal is generated based on one or more offsets associated with the matrix.

8. The method according to claim 7, wherein the one or more offsets are determined based on an index of the matrix in a lookup table.

9. The method according to claim 1, wherein determining the classification of the target block further comprises:
   in response to the target block having a size other than 4×4, 8×8, 4×N, and N×4, determining that the target block belongs to a third class.

10. The method according to claim 9, wherein generating the first intra prediction signal for the target block comprises:
    in response to the target block belonging to the first class or the second class, determining that the first intra prediction signal has a size of 4×4; and
    in response to the target block belonging to the third class, determining that the first intra prediction signal has a size of 8×8.

11. A system for processing video content, the system implemented in a decoder and comprising:
    a memory for storing a set of instructions; and
    at least one processor configured to execute the set of instructions for causing the system to perform:
       determining a classification of a target block, wherein:
          the target block is classified into a first class when the target block has a size of 4×4,
          the target block is classified into a second class when the target block has a size of 8×8, 4×8, or 8×4, and
          the target block is classified into the second class when the target block has a size of 4×N or N×4, wherein N is 16, 32, or 64; and
       generating, based on the classification, a matrix-weighted intra prediction (MIP) signal.

12. The system according to claim 11, wherein in generating the MIP signal, the at least one processor is further configured to execute the set of instructions for causing the system to further perform:
    generating a first intra prediction signal for the target block, the generating of the first intra prediction signal being based on an input vector, a matrix, and the classification of the target block; and
    performing bilinear interpolation on the target block using the first intra prediction signal, to generate the MIP signal.

13. The system according to claim 11, wherein the at least one processor is further configured to execute the set of instructions for causing the system to further perform:
    averaging, according to the classification of the target block, neighboring reconstructed samples of the target block, to generate the input vector.

14. The system according to claim 12, wherein the input vector has a size of 4×1 when the target block belongs to the first class or a size of 8×1 when the target block belongs to the second class.

15. The system according to claim 11, wherein the matrix is selected from a set of matrices, according to the classification of the target block and an MIP mode index.

16. The system according to claim 15, wherein the first intra prediction signal is generated by performing matrix vector multiplication on the matrix and the input vector.

17. The system according to claim 16, wherein the first intra prediction signal is generated based on one or more offsets associated with the matrix.

18. The system according to claim 17, wherein the one or more offsets are determined based on an index of the matrix in a lookup table.

19. A non-transitory computer readable medium that stores a bitstream generated according to a method for processing video content, the method comprising:
    determining a classification of a target block, wherein:
       the target block is classified into a first class when the target block has a size of 4×4,
       the target block is classified into a second class when the target block has a size of 8×8, 4×8, or 8×4, and
       the target block is classified into the second class when the target block has a size of 4×N or N×4, wherein N is 16, 32, or 64; and
    generating, based on the classification, a matrix-weighted intra prediction (MIP) signal.

20. The method according to claim 9, wherein generating the first intra prediction signal for the target block comprises:
    in response to the target block belonging to the first class, determining that the input vector has a size of 4×1;
    in response to the target block belonging to the second class, determining that the input vector has a size of 8×1; or in response to the target block belonging to the third class, determining that the input vector has a size of 7×1.

* * * * *